(No Model.) 4 Sheets—Sheet 1.
A. W. KIDDIE.
MEANS FOR DIVIDING BREAD AND APPLYING BUTTER THERETO.
No. 470,200. Patented Mar. 8, 1892.
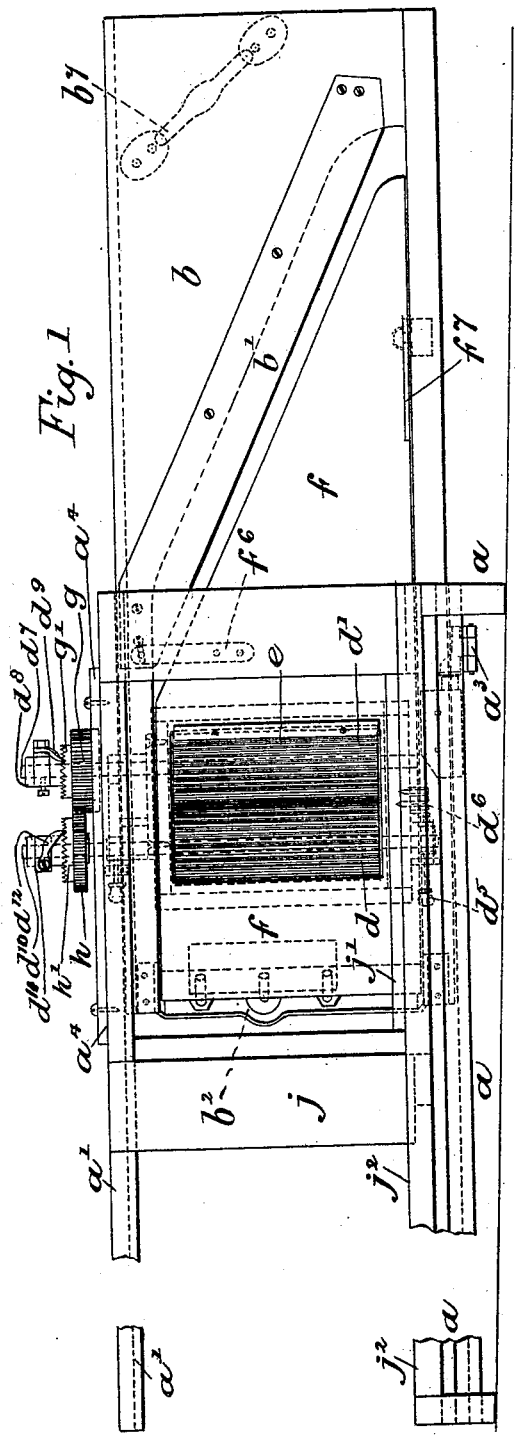
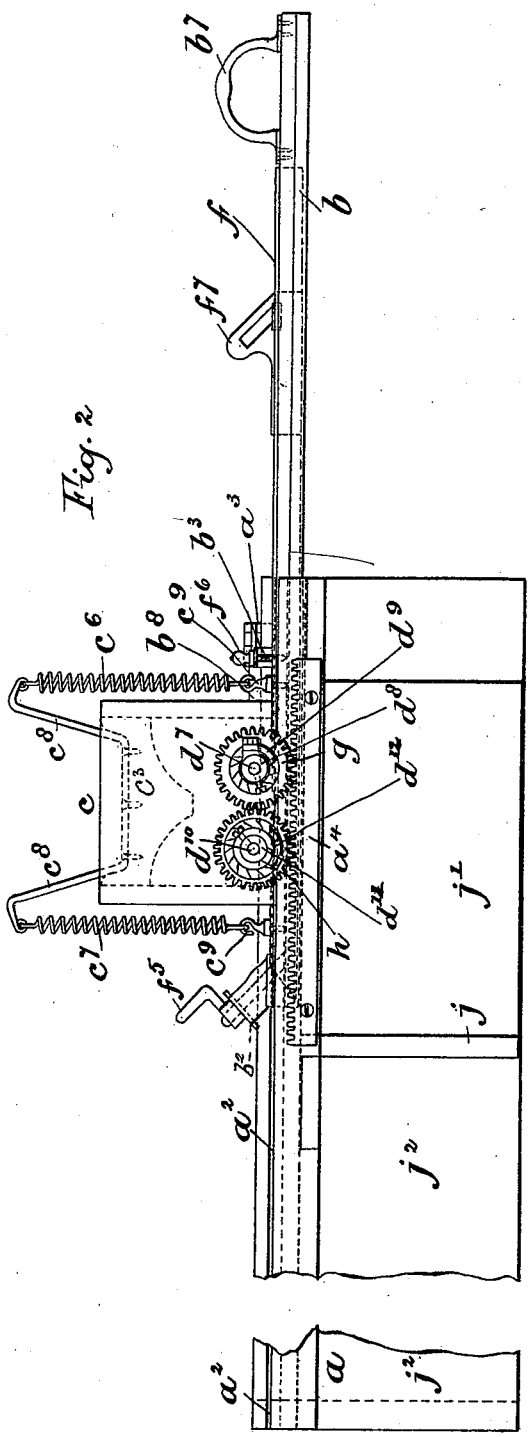
Witnesses
John Cullen
James Pott
Inventor
Andrew Webster Kiddie
By his Atty
John J. Halstead & Son

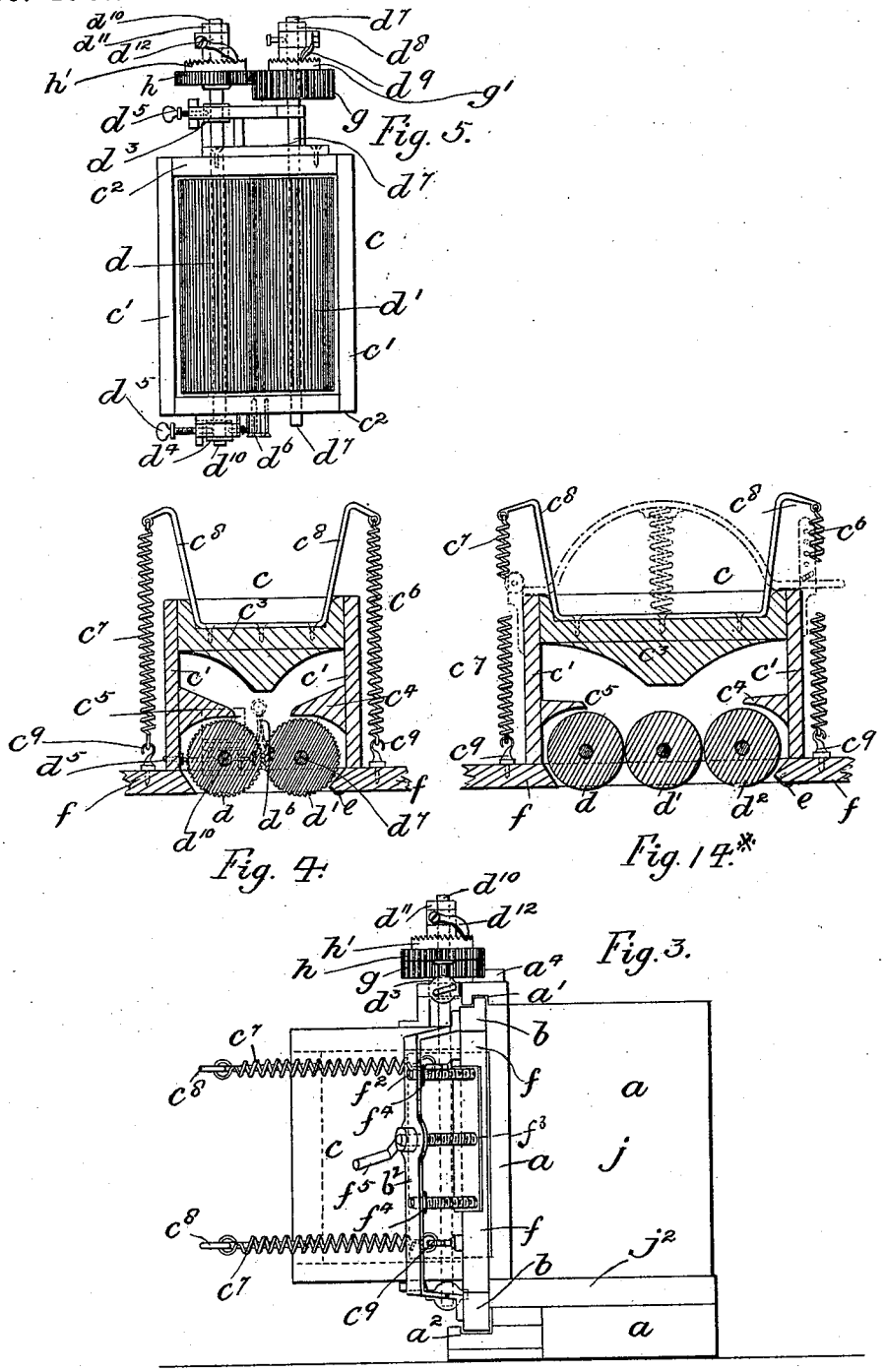

(No Model.) 4 Sheets—Sheet 3.

A. W. KIDDIE.
MEANS FOR DIVIDING BREAD AND APPLYING BUTTER THERETO.

No. 470,200. Patented Mar. 8, 1892.

Witnesses: John Cullen, James Pitts

Inventor: Andrew Webster Kiddie
By his att'ys John J. Halsted & Son

THE NORRIS PETERS CO., PHOTO-LITHO., WASHINGTON, D. C.

(No Model.) 4 Sheets—Sheet 4.
A. W. KIDDIE.
MEANS FOR DIVIDING BREAD AND APPLYING BUTTER THERETO.
No. 470,200. Patented Mar. 8, 1892.
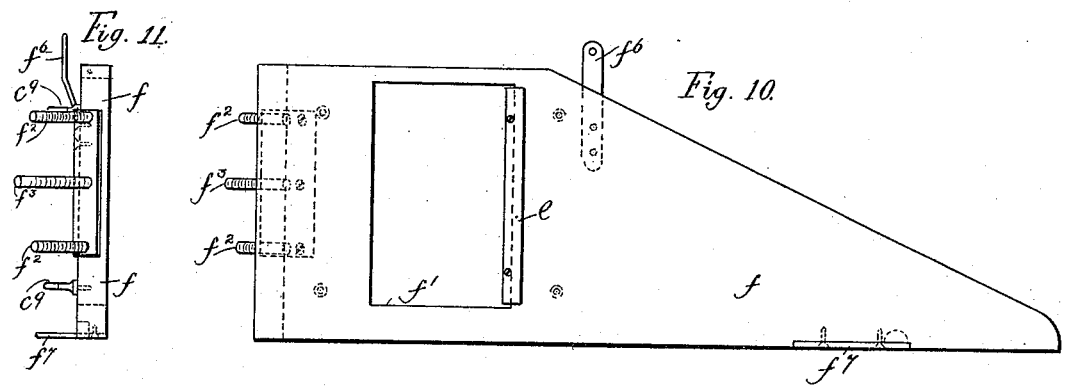
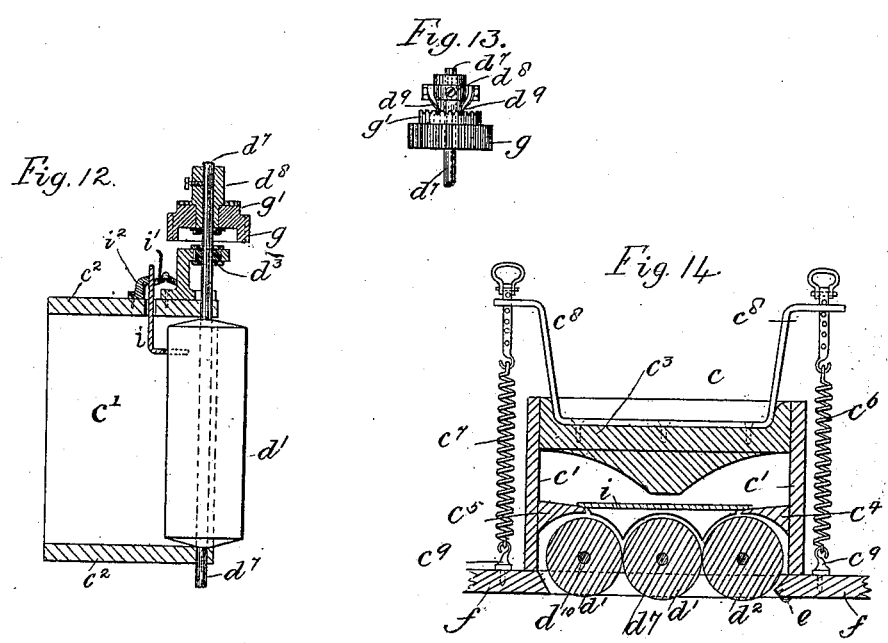

UNITED STATES PATENT OFFICE.

ANDREW WEBSTER KIDDIE, OF SOUTHPORT, ENGLAND.

MEANS FOR DIVIDING BREAD AND APPLYING BUTTER THERETO.

SPECIFICATION forming part of Letters Patent No. 470,200, dated March 8, 1892.

Application filed December 30, 1890. Serial No. 376,314. (No model.)

*To all whom it may concern:*

Be it known that I, ANDREW WEBSTER KIDDIE, joiner and builder, a subject of the Queen of Great Britain, residing at 36 Virginia Street, Southport, in the county of Lancaster, England, have invented certain new and useful Improvements in Means or Apparatus for Dividing Bread or Like Matters and Applying Butter or Like Matters Thereto, of which the following is a specification.

This invention relates to means or apparatus for superseding hand cutting and buttering of bread, as with a common table-knife, and to substitute mechanism for effecting such division of the bread or more rigid matter and spreading of the butter or plastic matter thereon, so as to effect these operations with cleanliness, economy, and rapidity.

Figure 8:
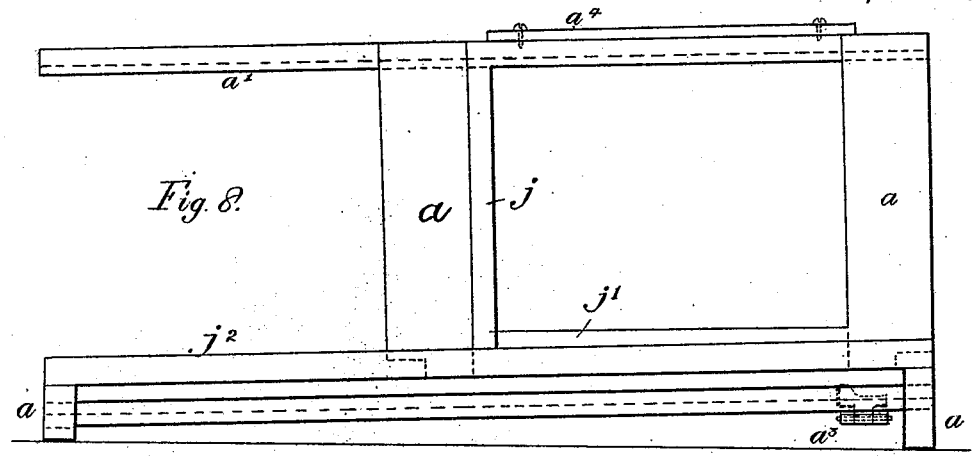
Figure 6:
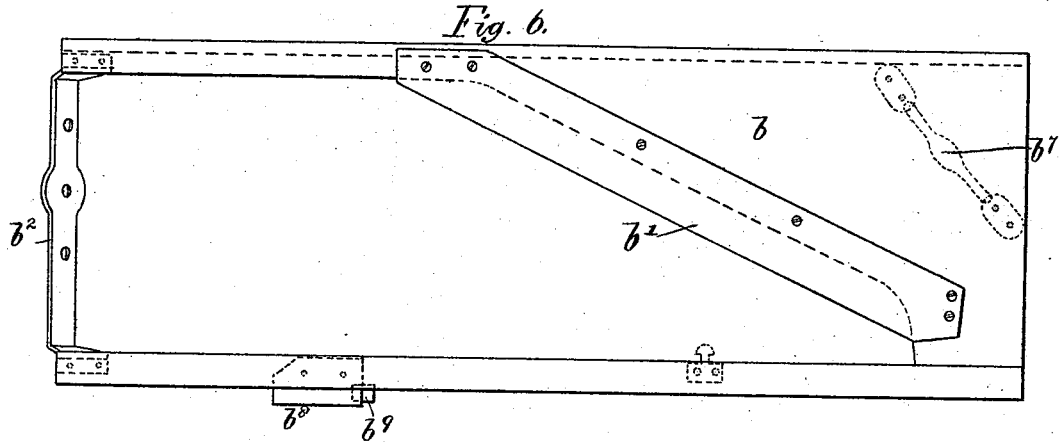
Figure 9:
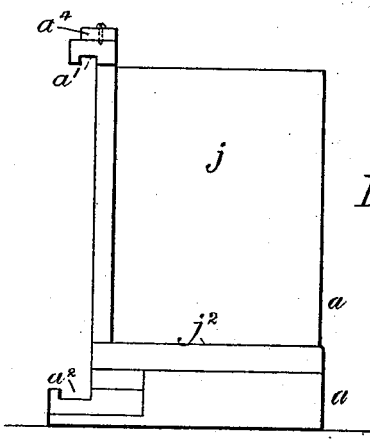
Figure 7:
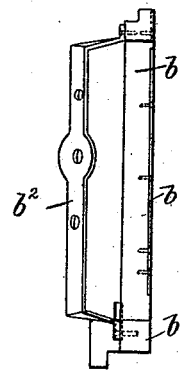

In the drawings, Figure 1 indicates by front view, Fig. 2 by plan view, and Fig. 3 by end view, one arrangement of the apparatus adapted for carrying out the invention. Fig. 4 shows a transverse section, and Fig. 5 a front view, of the buttering-rollers of Fig. 1 separately. Fig. 6 shows a front view, and Fig. 7 an end view, of the knife for severing the bread or cake into slices. Fig. 8 shows a front view, and Fig. 9 an end view, of frame-work and guideways in which the knife $b'$ reciprocates. Fig. 10 shows a front view, and Fig. 11 an end view, of the frame or plate having formed in it the aperture through which the butter-spreading rolls protrude. Fig. 12 shows a vertical sectional view of the buttering device and gearing for operating the same, and Fig. 13 is a detail view of the double-ratchet gear for working the buttering-rolls when the rolls are used to butter both in the stroke and return. Fig. 14 shows a transverse sectional view of a modified arrangement of buttering mechanism in which three rolls are arranged in the box to co-operate together to spread the butter on the bread. Fig. 14* shows another modification of the like mechanism shown by the last figure.

$a$ indicates the stand or frame-work, which may be attached to any suitable table or support and carrying a top guideway $a'$ and a bottom guideway $a^2$ for the slide $b$ to reciprocate in, and on this slide is mounted the knife $b'$, which I prefer to mount in the horizontally-reciprocating slide $b$, so as to act on the bread presented to it at an acute angle, owing to the angle at which this knife is set in the slide $b$. This slide $b$ also carries the box or receptacle $c$ for butter, formed by the two side walls $c'c'$, upper and under walls $c^2$, and back-pressing plate $c^3$.

On the side walls $c'c'$ are respectively mounted the two plates or ledges $c^4 c^5$, which serve to direct the butter to the nip of the rolls $d\ d'$. The rolls are formed with corrugated surfaces, which delivers the butter in a film of desired thickness upon the bread. In Figs. 14 and 14* the third roller $d^2$ aids in the delivery of the butter and prevents any accumulation against the edge runner-plate $e$.

If desired, a suitable opening in the slide, aided by a roller at the edges of the opening, will allow the butter to pass out and be spread on the bread.

The box $c$ is connected to the slide $b$ through the intervention of the plate $f$, which is provided with an opening $f'$ for the rollers $d\ d'$ to protrude through. The plate $f$ is connected by screws $f^2$ and $f^3$ and nuts $f^4$, the handle-nut $f^5$ being seated upon and engaging the frame $b^2$, the spring-plate $f^6$ above engaging a screw-stem and nut $b^3$ on the frame $b$. Hence the frame $b$ and plate $f$ are adjustably connected, so that the distance between the respective planes of their surfaces is regulated to determine the thickness of bread or cake cut.

$f^7$ is a bracket attached to plate $f$, and it has an inclined guide-slot, through which a stem projects from the plate $b$, so as to maintain parallelism between the surfaces of $b$ and $f$.

$b^7$ is the handle for moving the slide $b$.

$b^8$ is a stop-piece having a rubber or spring pad $b^9$ and secured to the slide $b$ to serve by coming in contact with a removable stop $a^3$ on the frame $a$ to control the travel of the slide $b$ in that direction. The press-plate $c^3$ in the box $c$ is kept pressed against the butter in that box and the butter against the rolls $d\ d'$ by means of springs $c^6 c^7$, connecting the arms $c^8$, affixed to $c^3$, with hooks $c^9$, secured to the plate $f$. The axis of the one roller $d$ is shown, Fig. 5, as being in adjustable bearings $d^3 d^4$, which, by means of screws $d^5 d^5$, aided by distending spring $d^6$, serve to regulate the proximity of rollers $d$ and $d'$, and thereby also the thickness of the stream of butter. The presser $c^3$ may be pressed forward or inward on the butter by a spring held to its work by a hinged bar, as shown by dotted lines in Fig. 14*, the hinge being connected to one wall $c'$ and the lock for the other end of the bar to the other opposite wall. The butter-rollers $d$ $d'$ are driven by means of a toothed rack $a^4$, affixed on the upper edge of the fixed frame $a$, and so that as the slide $b$ reciprocates the tooth-wheel $g$ engages those teeth $a^4$ and rotation is caused thereto. This wheel $g$ is formed in one with the ratchet-wheel $g'$, and this compound wheel is mounted loosely on the axis $d^7$ of the roller $d'$, on which axis is mounted and fixed the collar $d^8$, carrying the disengageable click $d^9$ for engaging the rack-teeth of the wheel $g'$. The teeth of the wheel $g$ engage the teeth of the wheel $h$, formed in one with the rack-toothed wheel $h'$, mounted loosely on the axis $d^{10}$ of the roller $d$, on which is mounted the collar $d^{11}$, carrying the disengageable click $d^{12}$ for engagement with the teeth $h'$, in order to communicate motion to the roller $d$.

In Figs. 12 and 14 I have shown a gage-board or sliding plate $i$, which is held from slipping down by friction-spring $i'$ and stop $i^2$, between which it is kept in its adjusted position by frictional contact, and is thus adapted to be slid up and down in the box $c$ to determine at what height butter shall be exuded from the slit between the rolls, this board being at its foot (see Fig. 14 in plan) shaped to approximately fit but not touch the rolls, actual contact being prevented by contact with the plates or ledges $c^4$ $c^5$.

In the arrangement shown by Figs. 12, 13, 14, and 14* the rollers $d$ and $d'$ rotate in a direction toward the bread to spread the butter, while the third roller rotates so as to aid in returning any excess of butter to the box $c$ and prevent accumulation between the bread and the edge of the slide $f$.

$j$ is a stop or abutment for the side of the loaf during cutting, and $j'$ is the floor or support for the same.

The buttered and severed bread may be received upon any suitable board or table—such, for instance, as indicated at $j^2$.

By throwing out of gearing with its rack-wheel one of the clicks $d^9$ or $d^{12}$ the operation of one of the rollers may be suspended when the butter-roll is not to operate and cutting only is desired.

By means of the double clicks $d^9$ in Fig. 13 the buttering may take place both in the stroke and the return of the slide, or both may be suspended from operation; but I find the action of the butter-roll in one direction to be sufficient.

Having now particularly described and ascertained the nature of my said invention and in what manner the same is to be performed, I declare that what I claim is—

1. A sliding knife or cutter for severing bread or like material into slices, combined with means, substantially as described, serving to hold, supply, and spread butter or spreadable matter on such bread or like material.

2. In combination with the sliding cutter of a bread or cake slicing mechanism, a means serving for applying butter, &c., thereto and to spread it over the material to be sliced prior to its severance from the main body or loaf, substantially as set forth.

3. In combination, a reservoir for butter or other matter to be spread, a pressure-plate in such reservoir, means for imparting pressure to said plate, a roller or rollers operating through an opening in the reservoir and serving to deliver the material to be spread in regulated quantity, and means, substantially as set forth, for actuating said rollers.

4. In combination with mechanism for butter-spreading and for slicing bread or cakes, a sliding plate $i$, frictionally held and adapted to be slid to position, as described, to determine and control the thickness of the butter or spread material, all substantially as set forth.

In testimony whereof I, the said ANDREW WEBSTER KIDDIE, have hereunto set my hand this 15th day of December, 1890.

ANDREW WEBSTER KIDDIE.

Witnesses:
ALFRED GEORGE BROOKES,
STANLEY GORDON SINCLAIR DICKER.